US008730838B2

(12) United States Patent
Liang et al.

(10) Patent No.: US 8,730,838 B2
(45) Date of Patent: May 20, 2014

(54) COMMUNICATION METHOD FOR MESH AND STAR TOPOLOGY STRUCTURE WIRELESS SENSOR NETWORK

(75) Inventors: Wei Liang, Shenyang (CN); Haibin Yu, Shenyang (CN); Xiaoling Zhang, Shenyang (CN); Miao Yang, Shenyang (CN); Weijie Xu, Shenyang (CN); Jun Wang, Shenyang (CN); Peng Zeng, Shenyang (CN); Zhijia Yang, Shenyang (CN)

(73) Assignee: Shenyang Institute of Automation of the Chinese Academy of Sciences, Shenyang (CN)

( * ) Notice: Subject to any disclaimer, the term of this patent is extended or adjusted under 35 U.S.C. 154(b) by 393 days.

(21) Appl. No.: 13/220,724

(22) Filed: Aug. 30, 2011

(65) Prior Publication Data
US 2011/0310770 A1 Dec. 22, 2011

Related U.S. Application Data

(63) Continuation of application No. 13/164,765, filed on Jun. 20, 2011, now abandoned, which is a continuation of application No. PCT/CN2009/075501, filed on Dec. 11, 2009.

(30) Foreign Application Priority Data

Dec. 19, 2008 (CN) .......................... 2008 1 0229991
Dec. 19, 2008 (CN) .......................... 2008 1 0229994

(51) Int. Cl.
*H04L 12/28* (2006.01)

(52) U.S. Cl.
USPC ........................................................ 370/254
(58) Field of Classification Search
CPC ...... H04W 74/02; H04W 84/18; H04W 84/10
USPC ........................................................ 370/254
See application file for complete search history.

(56) References Cited

U.S. PATENT DOCUMENTS

2007/0195808 A1* 8/2007 Ehrlich et al. ................. 370/408
2010/0158494 A1* 6/2010 King ............................... 396/56

OTHER PUBLICATIONS

IEEE Computer Society, IEEE Std 802.15.4-2006, 2006, IEEE.*

* cited by examiner

*Primary Examiner* — Dang Ton
*Assistant Examiner* — Kevin Lee
(74) *Attorney, Agent, or Firm* — Novick, Kim & Lee, PLLC; Allen Xue

(57) ABSTRACT

A method of achieving wireless sensor network (WSN) communication in a mesh and star topology network (MSTN), including: a) connecting a plurality of nodes in a WSN to form a mesh and star hybrid topology structure; b) based on the topology structure, defining a superframe structure based on IEEE 802.15.4-2006; c) based on the topology structure and superframe structure, defining methods for long period data processing, connectivity assessment, medium access control, channel measurement, frequency hopping, beacon frame formation, and two-stage resource allocation; d) based on the topology structure, superframe structure, and methods, defining a method for network establishment; and e) based on the network establishment method, defining a method for MSTN communications. The method features real-time communication, high reliability, and low energy consumption.

19 Claims, 10 Drawing Sheets

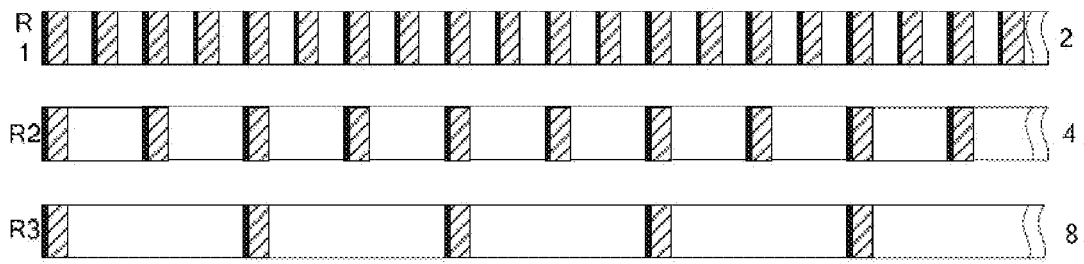
FIG. 4A
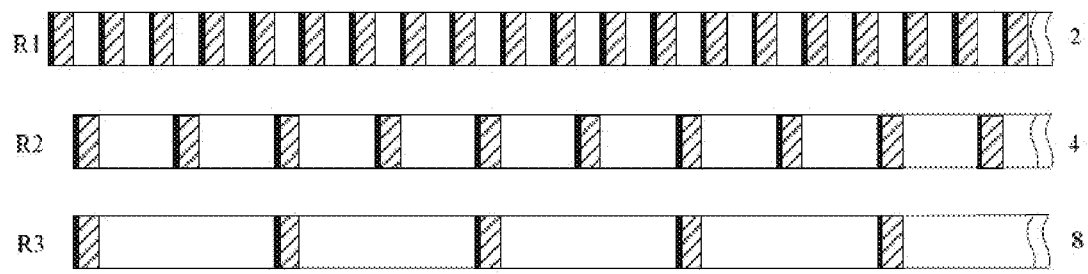
FIG. 4B
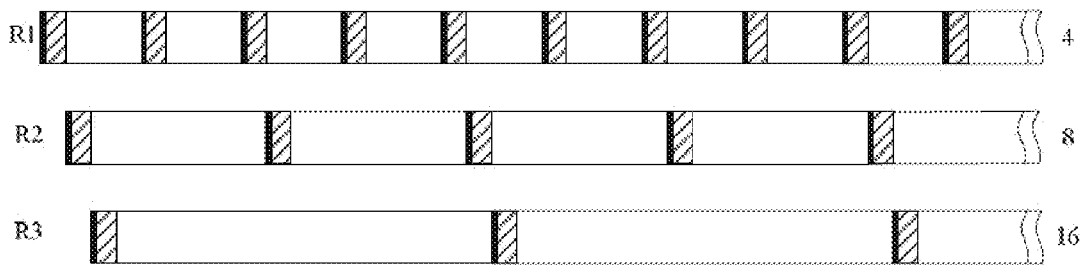
FIG. 4C
| Octets:1 | 2-7 | 8 |
|---|---|---|
| ClusterID | Absolute timeslot number | Channel in the next superframe cycle |
FIG. 5

| Octets:2 | 1 | 4/10 | 2 | Variable | Variable | Variable | 2 |
|---|---|---|---|---|---|---|---|
| Frame control | Sequency number | Addressing fields | Superframe specification | GTS fields | Pending address fields | Beacon payload | FCS |
| MHR | | | MAC payload | | | | MFR |

FIG. 6

COMMUNICATION METHOD FOR MESH AND STAR TOPOLOGY STRUCTURE WIRELESS SENSOR NETWORK

CROSS-REFERENCE TO RELATED APPLICATIONS

This application is a continuation of U.S. Ser. No. 13/164,765 filed on Jun. 20, 2011, which is a continuation National Stage Application of International Patent Application No. PCT/CN2009/075501 with an international filing date of Dec. 11, 2009, designating the United States, now pending, and further claims priority benefits to Chinese Patent Application No. 200810229994.9 filed Dec. 19, 2008 and Chinese Patent Application No. 200810229991.5 filed Dec. 19, 2008. The contents of the aforementioned specifications are incorporated herein by reference.

BACKGROUND OF THE INVENTION

1. Field of the Invention

The invention relates to a wireless communication technology, and more particularly to a communication method for a mesh and star topology structure wireless sensor network featuring a hybrid multiple access and adaptive frequency hopping.

2. Description of the Related Art

Industries have benefited significantly from using wireless sensor networks (WSNs). In contrast with wired networks, wireless networks do not require wiring between nodes, and they are easy to maintain, highly flexible, and may be rapidly implemented, all of which exhibits obvious advantages in industrial applications. Wireless industry has developed as wireless communication technologies have matured and costs decreased. A typical industrial wireless measurement and control network is illustrated in FIG. 1. Nodes of wireless sensors or actuators are distributed at each observation point in an industry field. These nodes, together with those having a routing function, form a network, and send field monitoring data to gateway nodes via multi-hop routing. Aside from the convenience introduced by industrial wireless networks, the requirements for wireless networks imposed by industrial applications are strict and demand reliable, real-time operation with energy conservation to achieve high-quality communication. In terms of reliability, multi-frequency narrow band jamming, interference from coexisting networks, and multi-path effects are problematic for the use of scarce channel resource to achieve reliable communication. There is a need to identify solutions to the reliability problems associated with these effects. In terms of timeliness, industrial applications have more strict requirements than other applications because time is of the essence in industrial communications, and even a small delay can result in grave accidents. In terms of energy conservation, low energy consumption is a key to guaranteeing long-term operation, as well as to reducing costs, especially for nodes attached to power sources that are difficult to replace. Because the WSN technology is feasible in practice, more and more people are recognizing the advantages of a carefully crafted communication topology, particularly the communication process used in mesh and star topology WSNs (MSTN). MSTNs are typical of WSNs used in industrial applications. However, an MSTN that can simultaneously realize reliable, real-time, and energy-saving communication has not been reported.

SUMMARY OF THE INVENTION

In view of the above-described problems, it is one objective of the invention to provide a method of communication that is reliable, real-time, and flexible, based on a mesh and star topology wireless sensor network (MSTN) featuring a hybrid multiple access and adaptive frequency hopping (AFH).

To achieve the above objective, in accordance with one embodiment of the invention, there is provided a method of communications based on an MSTN, comprising the steps of:

a) connecting a plurality of nodes in a wireless sensor network (WSN) to form a mesh and star hybrid topology structure;

b) based on the topology structure, defining a superframe structure based on IEEE 802.15.4-2006;

c) based on the topology structure and superframe structure, defining methods for long period data processing, connectivity assessment, medium access control, channel measurement, frequency hopping, beacon frame formation, and two-stage resource allocation;

d) based on the topology structure, superframe structure, and methods, defining a method for network establishment; and e) based on the network establishment method, defining a method for MSTN communications.

In a class of this embodiment, the MSTN comprises four types of physical nodes: gateway nodes, routing nodes, field nodes, and handheld nodes. The gateway nodes are a gathering center of data and provide interfaces for the MSTN and other MSNs to connect with a wired network, such as the Ethernet. The routing nodes support all types of sensors and are used to duplicate and retransmit data in the MSTN. The field nodes are set up in industrial fields and connected with sensors and actuators for transmitting process measurement and control data to accomplish specific applications. The handheld nodes access network temporarily and configure and maintain the MSTN nodes.

In a class of this embodiment, the gateway nodes comprise two function modules: a network manager and a security manager. The network manager and security manager achieve their functions separately. The network manager is used for managing node additions, forming a network, and monitoring the performance of the whole network. The security manager is used for key management and security authentication of routing nodes and field nodes.

In a class of this embodiment, the mesh and star hybrid topology structure comprises a first level and a second level. The first level is a mesh network comprising the routing nodes and the gateway nodes. The routing nodes communicate with at least one field node, one gateway node, and another routing node. The second level is a star network comprising the routing nodes and the field nodes, which is also called a cluster. The field nodes communicate with only one routing node, but not with each other.

In a class of this embodiment, the superframe structure is based on a medium access control (MAC) layer of IEEE 802.15.4-2006, and comprises a beacon frame period, a contention access period (CAP), a contention-free access period (CFP), an intra-cluster communication period, an inter-cluster communication period, and a sleeping period, wherein The beacon frame period is used for timeslot synchronization and superframe information publishing;

The CAP is used for node addition and intra-cluster management, and realizes medium access control by the timeslot carrier sense multiple access with collision avoidance (CSMA/CA) algorithm;

The CFP is used for emergency communications, communications among handheld nodes and cluster heads, which are distributed by the routing nodes; the CFP uses a time division multiple access (TDMA) to achieve communication;

The intra-cluster communication period, which is used for intra-cluster communication, expands the CFP;

The inter-cluster communication period is used for the inter-cluster communication and management;

Both intra-cluster communication and inter-cluster communication adopt the TDMA approach and timeslot frequency hopping communication. Communication resources are written to nodes in the form of <channel, timeslot>.

In a class of this embodiment, the superframe is maintained by each node, and the superframe length in each period is defined by the node; the superframe length is $2^N$ times the basic length of the superframe (N is a positive integer). The basic length of the superframe is 32 timeslots. The superframe length of the field nodes is decided by the data update rate; the superframe length of the routing nodes is the minimum superframe length of all field nodes in the star network; the superframe length in the gateway nodes is decided by the minimum superframe length of neighboring routing nodes thereof.

In a class of this embodiment, the intra-cluster communication is communication between the routing nodes and the field nodes; the inter-cluster communication is communication among the routing nodes or between the routing nodes and the gateway nodes.

In a class of this embodiment, the beacon frame period, contention access period, and contention-free access period use the same channel in a single superframe cycle; if a channel is lacking, communication among the different clusters adopt a time division strategy.

In a class of this embodiment, a payload of the beacon frame publishes the extensional superframe information at least comprising the following information: a cluster ID, an absolute timeslot number, and a next channel used in the next superframe cycle.

In a class of this embodiment, the beacon frames are sent in the following modes:
  the gateway nodes and routing nodes send the beacon frames, but do not forward the beacon frames;
  the gateway nodes send beacon frames for time synchronization and joining of neighboring routing nodes and for broadcasting the superframe information of the gateway nodes; and
  the routing nodes send the beacon frame for time synchronization and joining of the intra-cluster field nodes and for broadcasting the superframe information of the gateway nodes.

In a class of this embodiment, the long period data is defined as the data whose data update rate is either greater than the maximum superframe length of IEEE 802.15.4-2006 or greater than the data update period of the routing nodes in a cluster.

In a class of this embodiment, the long period data transmitted in the current superframe cycle are judged by the following method:

$$TransmitFlag = \left[\frac{AbsoluteSlotNumber - ActiveSlot + 1}{NumberSlots}\right] \% SuperframeMultiple$$

If 0<TransmitFlag<SuperframeMultiple and TransmitFlag=LinkSuperframeNum, the field nodes transmit data in this superframe cycle;

If TransmitFlag=0 and LinkSuperframeNum=SuperframeMultiple, the field nodes transmit data in this superframe cycle; and Otherwise, the long period data are not transmitted in the current superframe cycle.

In a class of this embodiment, the frequency hopping comprises the following three mechanisms:

Adaptive Frequency Switch (AFS): in the MSTN superframe, the beacon period, contention access period, and contention-free access period use the same channel in the same superframe cycle, and the channels change according to the channel conditions in different superframe cycles. When the channel conditions are bad, the nodes change the communication channel. The channel conditions are evaluated by Packet Loss Rate and retransmission times.

Adaptive Frequency Hopping (AFH): in the MSTN superframe, the timeslot of intra-cluster communication stage changes the communication channel according to the channel conditions; when the channel conditions are bad, the nodes change the communication channel conditions. The channel conditions are evaluated by Packet Loss Ratio and retransmission times. The intra-cluster communication period of an inactive period adopt the hopping mechanism. The structure of the frequency hopping sequence is: <timeslot 1, channel 1> <timeslot 2, channel 2> . . . <timeslot i, channel i>.

Timeslot Hopping (TH): to avoid interference and fading, the user changes communication channel in each timeslot according to a frequency hopping sequence that is predefined by the user; the timeslot hopping mechanism is employed for intra-cluster communication during the inactive period; the structure of frequency hopping sequence is: <timeslot 1, channel 1> <timeslot 2, channel 2> . . . <timeslot i, channel i>.

For AFS, the beacon frame of the last superframe period forecasts the channel that will be used in the next superframe cycle. For AFH, the last timeslot forecasts the channel that will be used in the next timeslot.

In a class of this embodiment, the channel measurement is carried out as follows:

The channel measurement is used to offer the channel conditions to the network manager and the route nodes, thereby helping the network manager and route nodes allocate a communication channel. One field node (or routing node) can measure one or more channel conditions and report the statistical information to the route nodes (or a network manager). The field nodes transmit the measurement result collected therefrom to the route nodes, and the route nodes transmit the channel conditions collected therefrom and the channel conditions from the field nodes to the network manager.

In the process of channel measurement, each node records the conditions of all the channels communicating with the node during the measurement period; the recorded performance information comprises: link quality indication (LQI), packet loss rate, and retransmission times; the packet loss rate are determined by the number of the acknowledgment frames (ACK) and the number of transmitted packets.

The method of two-stage resource allocation is as follows:
  The network manager in the gateway nodes allocates resources for the routing nodes in a mesh network. The resources comprise resources used by the routing nodes for communications in the mesh network and resources that the routing nodes allocate to the field nodes; and
  the routing node allocates communication resources to the field nodes of the star network.

The following schedules are employed for allocating resources in the star network:
First allocating fixed channels;
First allocating timeslots to the nodes with the fastest update rate;
First allocating resources to the packet with the earliest generating time; and
First allocating resources to the highest priority packet.

The routing nodes and field nodes should save, respectively, the resources allocated by the network manager for the routing nodes and the resources allocated by the routing nodes for the field nodes. These resources involve superframe and link attributes. The link attributes comprise the information related to communication in each timeslot in the superframe attributes, and declare the communication parameters among adjacent nodes in the network. Each node should maintain its own link information.

The superframe attribute comprises SuperframeID, SuperframeMultiple, NumberSlots, ActiveFlag, and ActiveSlot. The link attributes comprises LinkID, NeighborID, LinkType, RelativeSlotNumber, LinkSuperframeNum, ActiveFlag, ChannelIndex, and SuperframeID.

The routing nodes or field nodes make one or more connective assessments before joining the MSTN network according to the connectivity assessment method, and they choose one or more father nodes. The indices of connectivity evaluation comprises: received signal strength indication (RSSI), energy detection (ED), and link quality indication (LQI).

In a class of this embodiment, the network establishment method is as follows:
The joining request and joining response of the field nodes or handheld nodes must be forwarded by the routing nodes already present in the network. If the routing node cannot reach the gateway node in one hop, other routing nodes are needed to forward the joining request and joining response.

The contents of the joining request comprise the physical address and the node type; the contents of joining response comprise the joining state, the physical address of the new node, and the short address of the new node. The joining state indicates the result of the node that is applying for joining the network; the short address of the new node is a 16-bit address distributed by the gateway node after the node successfully joins.

The process by which a node joins a network is as follows:
1) Network discovery: the node waiting for joining the network continues to scan available channels in the network until it successfully receives a beacon from joined routing nodes or gateway nodes;
2) Time synchronization: the node waiting for joining the network chooses the beacon-emitting node as the proxy routing node, and uses the time information in the beacon to complete the time synchronization;
3) Sending a joining request: the node waiting for joining the network sends a request to the proxy routing node, and the proxy routing node forwards this request to the gateway node;
4) Returning a joining response: after the gateway node receives the joining response and finishes the security authentication, the joining response is returned;
5) Processing the response: the node waiting for joining the network receives a joining response forwarded by the proxy routing node. If the response is negative, the node waiting for joining the network shall restart this joining process; otherwise, the joining process shall be finished; and
6) Broadcast beacon: If the node waiting for joining the network has successfully joined the network and is acting as a routing node, it shall broadcast beacons.

The gateway node allocates communication resources and routes to a node after the node joins the network. The processes of resource allocation to routing nodes, field nodes, and handheld nodes are different.

In the process of allocating communication resource to the routing nodes, if a new routing node joins the network by one hop, the gateway node directly builds a superframe for it and allocates superframes, links and routes to this routing node by using the command frames that operates on the superframes, links and routes; if the new routing node joins the network by multi-hops, the command frames that operates on the superframes, links and routes should be forwarded by the existing routing nodes.

The process of allocating communication resources to the routing nodes is as follows:
after joining a network, the routing node reports neighbors' information thereof to the gateway node;
the gateway node configures a routing table for the new routing node based on the reported neighbors' information;
the gateway node configures a superframe table for the new routing node based on the reported neighbors' information; and
the gateway node configures a link table for the new routing node based on the reported neighbors' information.

In the process of allocating communication resource to a newly joined field node, the communication resources are pre-allocated by the gateway node to the routing node in one cluster, and then allocated to the newly joined field node by the cluster head. The communication resources of the field node are used for intra-cluster communication in a superframe.

The process by which communication resources for field nodes are allocated is as follows:
a user configures the field node;
if joining of a fixed field node affects the superframe of the routing node, the routes, superframes, and links thereof should be updated; and
the routing node saves the routing information, superframes, and links locally, allocates resources for the field node based on the resource situation, then, the routing node writes the superframe information and links into the field node.

The processes of allocating resources to the handheld and field nodes differ in that the communication resources of handheld nodes are in the CFP of a superframe.

Advantages of the invention, for example, real-time communication, reliability, and low energy consumption, are described in detail below:
1) This invention uses a hybrid mesh and star topology structure, which, simplifies the network structure, lowers the difficulties of maintenance and management, and improves the system's flexibility; and, the mesh structure improves the reliability of the network.
2) This invention uses and expands the superframe structure of IEEE 802.15.4-2006 standard. It fully takes the advantages of IEEE 802.15.4-2006, improves the system's compatibility, and protects the existing investment. It simplifies the design and greets the demands of the industrial applications.
3) This invention expands the long period data procedure. It can process the transmission of the data using a long data update rate in the process industry, and makes it simple and easy.

4) This invention uses the hybrid mechanism of frequency division and time division, thereby expanding the network capacity and increasing the network reliability.
5) This invention uses the hybrid strategy comprising inter-cycle adaptive frequency switch and intra-cycle frequency hopping technology. It uses fixed channel during one cycle, which increases the network compatibility and it use both adaptive frequency switch and frequency hopping technology to improve the network reliability.
6) This invention uses a hybrid MAC method based on both competition and scheduling. It increases the flexibility by using the competition MAC and has the good timeliness and low energy consumption by using the scheduling MAC.
7) This invention uses a two-stage resource allocation policy comprising a mix of global resource allocation and local resource allocation. The global resource allocation ensures the optimal resource allocation. The local resource allocation alleviates the burden of the global resource allocation, increases the efficiency of the resource allocation, and improves the network flexibility and scalability.
8) This invention designs methods for routing a node using multi-hop joining and routing node forwarding the joining request and joining response for field nodes and handheld nodes. The invention makes full use of the join mechanism supported by IEEE 802.15.4-2006. It also expands the multi-hop method by which network nodes join based on the IEEE 802.15.4-2006, by removing the need for the node waiting to join the network to be located at the receiving scope of the gateway node. Therefore, it expands the network scale and realizes uniform management of the gateway node to network nodes.

BRIEF DESCRIPTION OF THE DRAWING

FIG. 4A is a diagram showing frequency division multiple access of MSTN superframe according to one embodiment of the invention;

FIG. 4B is a diagram showing time division multiple access and frequency division multiple access of MSTN superframe according to one embodiment of the invention;

FIG. 4C is a diagram showing time division multiple access of MSTN superframe according to one embodiment of the invention;

FIG. 5 is a detailed diagram of a beacon frame payload according to one embodiment of the invention;

FIG. 6 is a diagram of a beacon frame format based on IEEE 802.15.4-2006 according to one embodiment of the invention;

DETAILED DESCRIPTION OF THE INVENTION

Detailed descriptions are provided below to supplement the accompanying drawings. It should be noted that the technologies involved in this invention are not only suitable for the following examples, but also for all appropriate systems and networks.

A method of communications based on an MSTN, comprises the steps of:
 a) connecting a plurality of nodes in a wireless sensor network (WSN) to form a mesh and star hybrid topology structure;
 b) based on the topology structure, defining a superframe structure based on IEEE 802.15.4-2006;
 c) based on the topology structure and superframe structure, defining methods for long period data processing, connectivity assessment, medium access control, channel measurement, frequency hopping, beacon frame formation, and two-stage resource allocation;
 d) based on the topology structure, superframe structure, and methods, defining a method for network establishment; and
 e) based on the network establishment method, defining a method for MSTN communications.

Figure 1:
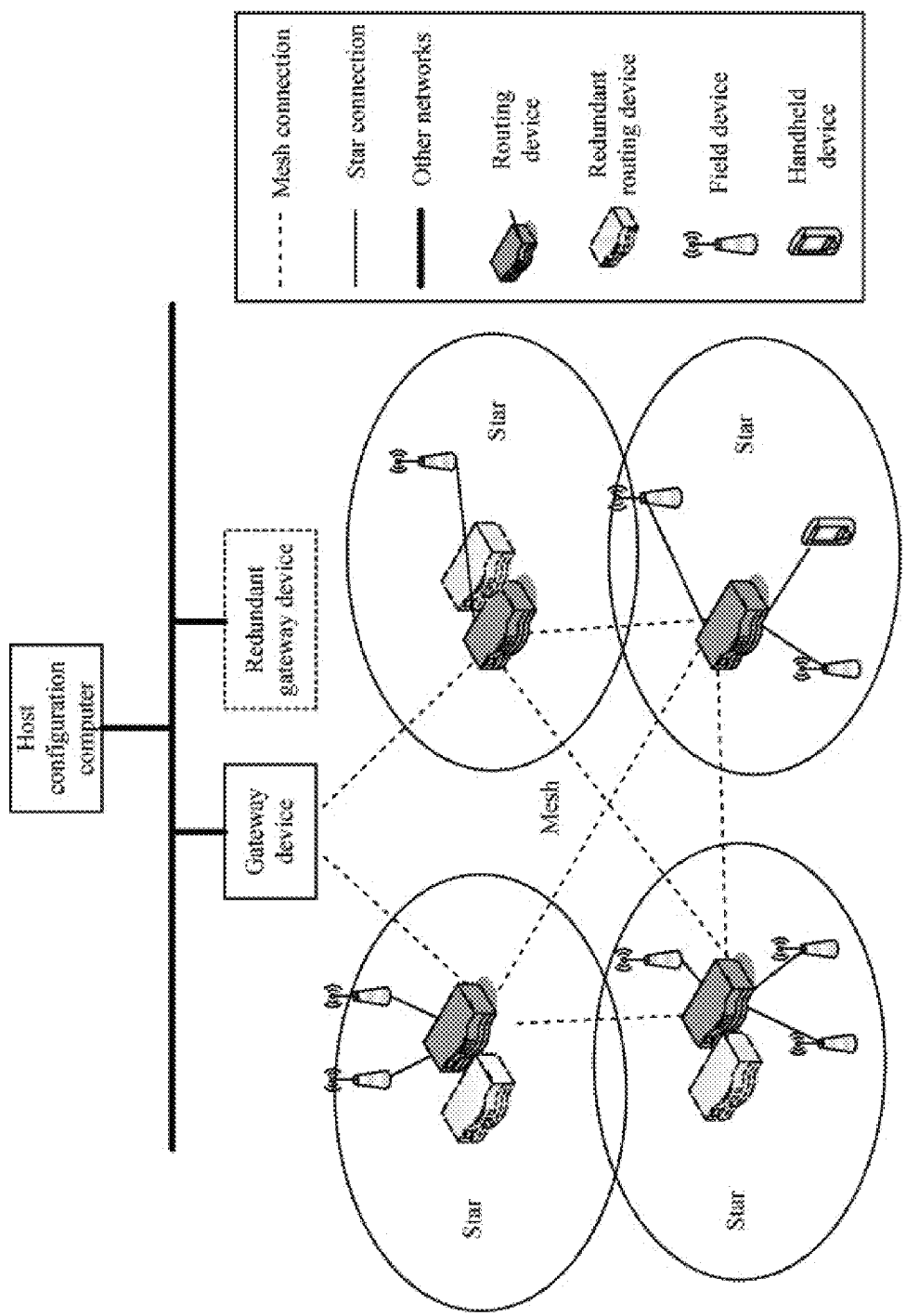
FIG. 1 is a physical topology structure diagram of an MSTN network according to one embodiment of the invention.

As shown in FIG. 1, the hybrid mesh and star hybrid topology structure comprises the following 4 categories of physical nodes:
 1. Gateway Node A gateway node is a data converging center, and provides interfaces for an MSTN and other WSNs. The gateway node in the invention is a single node that acts as a measurement center and a control clearing center in the network. The gateway node can connect with a wired network, such as an Ethernet network. The gateway node has two function modules (a network manager and a security manager) that, respectively, realize the functions of network management and security management. The network manager manages the joining of a node and formation of a network, and monitors the network performance. The security manager manages and certifies keys for the routing nodes and field nodes.
 2. Routing Node A routing node duplicates and forwards data in the MSTN. The routing node transmits or forwards data to a gateway node, routing node, field node, and handheld node in the network. The routing node also supports all kinds of sensors.
 3. Field Node A field node is installed in industrial fields and connects with sensors and actuators to transmit measurement and control information to complete a specific application.
 4. Handheld Node A handheld node configures and maintains the MSTN network nodes. The handheld node can access the network temporarily. If there is no specific illustration, the field node mentioned in this invention comprises a handheld node.

As shown in FIG. 1, a hybrid mesh and star hierarchical topology structure for MSTNs comprises two levels. The first level comprises a mesh network, in which routing nodes and gateway nodes are deployed. The routing nodes communicate with at least one field node, one gateway node, and one another routing node. The second level comprises a star network, in which routing nodes and field nodes are deployed. This level is also called a cluster. The field nodes communicate with only one routing node, but not with each other. In the star network, the routing node is the cluster head, and the field node is a cluster member.

Among conventional wireless communication standards, the IEEE 802.15.4-2006 has low energy consumption, low cost, easy use, and high flexibility, which makes it a good underlying communication protocol for the WSNs. The communication method of this invention is based on the IEEE 802.15.4-2006.

Figure 2:
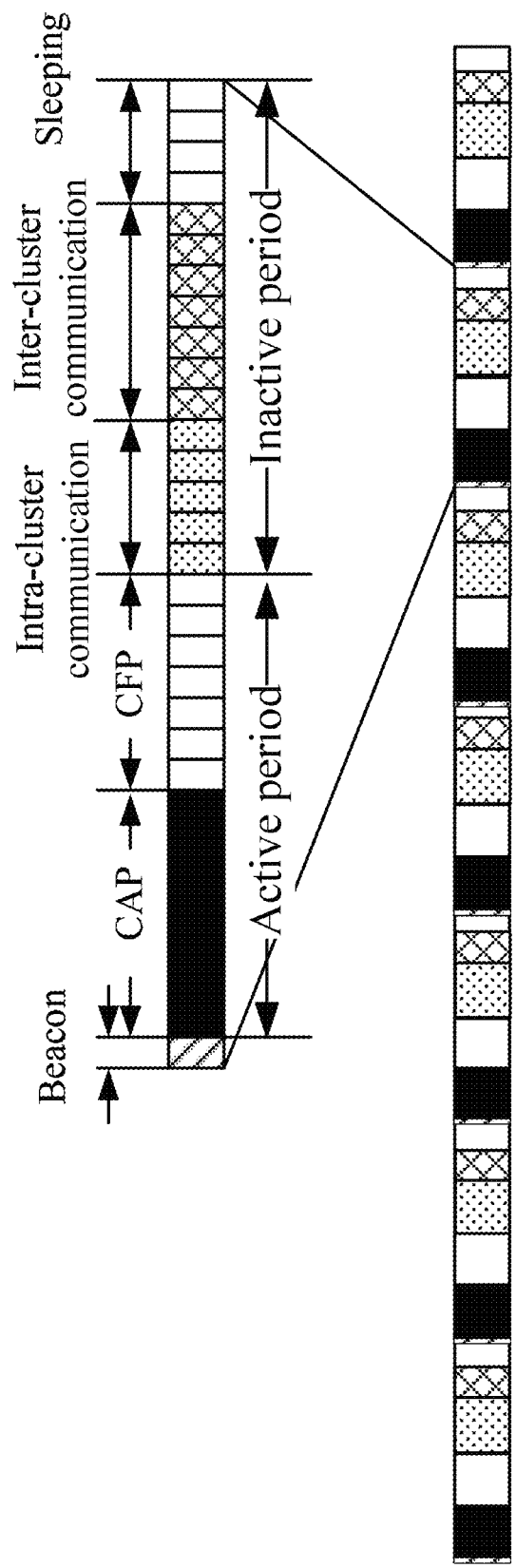
FIG. 2 is an MSTN superframe structure diagram according to one embodiment of the invention.

As shown in FIG. 2, to be compatible with IEEE 802.15.4, the superframe structure of IEEE 802.15.4-2006 is extended in the invention. The extended superframe structure comprises:
 a beacon frame period for timeslot synchronization and superframe information publishing;
 a CAP for node addition and intra-cluster management, which realizes medium access control by the timeslot CSMA/CA algorithm;
 a CFP for emergency communications, communications among handheld nodes and cluster heads distributed by routing nodes themselves, which adopts time division multiple access (TDMA) to communicate in contention-free access period;
 an inactive period for intra-cluster communication, inter-cluster communication, and sleeping, which is uniformly allocated by the network manager; the intra-cluster communication period being an extension of the CFP and used for intra-cluster communication; the inter-cluster communication period being used for inter-cluster communication and management; both the intra-cluster communication period and the inter-cluster communication period communicating using TDMA.

The inter-cluster communication comprises communication between the routing nodes and the field nodes. The intra-cluster comprises communication among the routing nodes and communication between the routing nodes and the gateway nodes.

Because the timeslots in the inactive period of the IEEE 802.15.4-2006 is used for the inter-cluster communication, intra-cluster communication, and sleeping, the basic superframe length of this invention is 32 timeslots, and the superframe length is $2^N$ times the basic superframe length (N is a positive integer). The superframe length of the field node is decided by the data update rate. The superframe length of the routing node is the minimum superframe length of all the field nodes in the star network. The superframe length of the gateway node is decided by the minimum superframe length of the neighboring routing nodes thereof.

In IEEE 802.15.4-2006, the maximum superframe length has a limit. However, in many applications, the data update rate may exceed that of the IEEE 802.15.4-2006. In this invention, the long period data in the MSTN is defined as the data whose data update rate is either greater than the maximum superframe length of IEEE 802.15.4-2006 or greater than the data update rate of a routing node in a cluster.

To process long period data, the following parameters are needed:
 AbsoluteSlotNumber: the absolute timeslot number in the beacon;
 ActiveSlot: the timeslot number when a superframe is active;
 NumberSlots: the total number of timeslots in a superframe;
 SuperframeMultiple: the least common multiple of the data update rates among all long period data; and
 LinkSuperframeNum: the ratio of the long period data update cycle to the superframe length.

The ranges and the definitions of these parameters are shown in Tables 2 and 3.

Defining TransmitFlag as the formulas below:

$$TransmitFlag = \left[ \frac{AbsoluteSlotNumber - ActiveSlot + 1}{NumberSlots} \right]$$
$$\% \, SuperframeMultiple$$

In every superframe cycle, the field nodes receive the beacon frame and decide whether to send long period data in this super frame cycle. The rules are as follows:
 If 0<TransmitFlag<SuperframeMultiple and TransmitFlag=LinkSuperframeNum, then the field node transmits data in this superframe cycle;
 If TransmitFlag=0 and LinkSuperframeNum=SuperframeMultiple, then the field node transmits data in this superframe cycle; and
 Otherwise, the long period data are not transmitted in the current superframe cycle.

Figure 3:
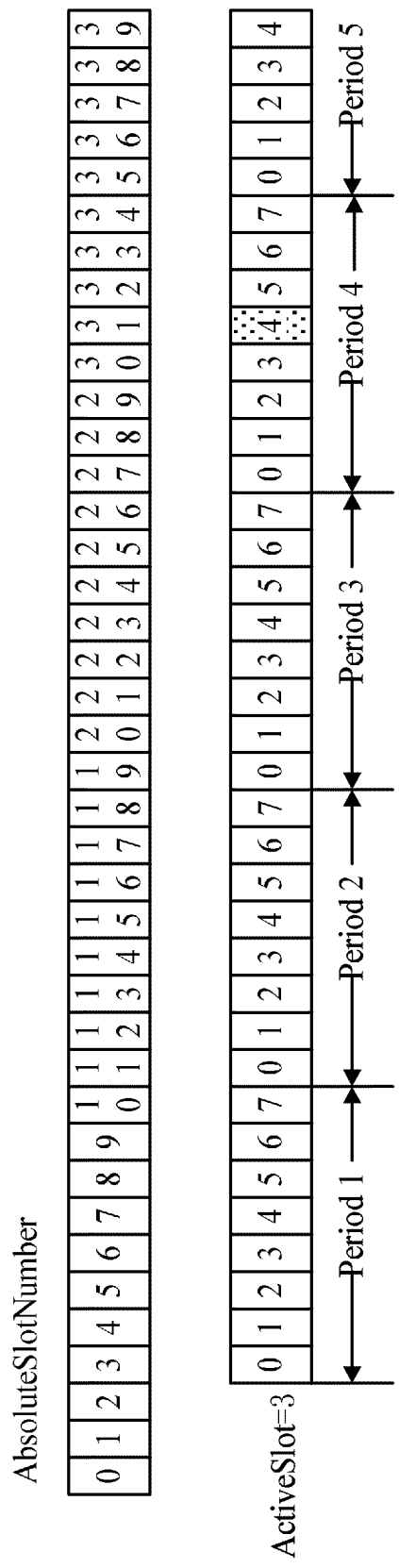
FIG. 3 is a long period data processing diagram according to one embodiment of the invention.

As shown in FIG. 3, an example of processing long period data. Assume a timeslot for the data allocation to be timeslot 4 in the fourth period; the absolute timeslot of the current Beacon is 27; and SuperframeMultiple=4. Therefore, we have: ActiveSlot=3, NumberSlots=8, AbsoluteSlotNumber=27, and LinkSuperframeNum=4.

TransmitFlag is calculated as follows:

$$TransmitFlag = \left( \frac{27 - 3 + 1}{8} \right) \% 4 = 0$$

According to the calculation result, it can be concluded that TransmitFlag=0 and SuperframeMultiple=LinSuperframeNum. Therefore, a packet shall be transmitted during the current superframe cycle.

During the beacon, CAP, and CFP periods, the same channel is used in a single superframe cycle. If the number of channels is insufficient, the MSTN uses a TDMA mechanism. FIGS. 4A, 4B, and 4C show three superframes. FIG. 4A shows the case in which only frequency-division but not time-division is used during the Beacon, CAP, and CFP periods of a beacon frame. FIG. 4B shows the case in which frequency-division and time-division are used during the Beacon, CAP, and CFP periods of a beacon frame. FIG. 4C shows the case in which time-division is used during the Beacon, CAP, and CFP periods of a beacon frame. FIG. 4A shows the superframe lengths of R1, R2, and R3, which are, respectively, two basic superframe lengths, four basic superframe lengths, and eight basic superframe lengths. The Beacon, CAP, and CFP periods of R1, R2, and R3 overlap, so the three routing nodes require three channels to communicate during the Beacon, CAP, and CFP periods. FIG. 4B shows the superframe lengths of R1, R2, and R3, which are, respectively, two basic superframe lengths, four basic superframe lengths, and eight basic superframe lengths. The Beacon, CAP, and CFP periods of R1 do not overlap with those of R2 and R3, so the three routing nodes require only two channels to communicate during the Beacon, CAP, and CFP periods. FIG. 4C shows the superframe lengths of R1, R2, and R3, which are, respectively, four basic superframe lengths, eight basic superframe lengths, and sixteen basic superframe lengths. The Beacon, CAP, and CFP periods of R1, R2, and R3 do not overlap, so the three routing nodes require only one channel to communicate during the Beacon, CAP, and CFP periods.

This invention uses the beacon payload of IEEE 802.15.4-2006 medium access control layer (MAC) to distribute the extended superframe information. The beacon payload is shown in FIG. 5, which comprises: a Cluster ID, an absolute timeslot number, and a channel used during the beacon period and the active period in the next super frame cycle.

The format of the Beacon frame is shown in FIG. 6. The MSTN of the invention follows the IEEE 802.15.4-2006 MAC beacon frame (see IEEE 802.15.4-2006 for details).

The beacon enabled mode in the IEEE 802.15.4-2006 lacks scalability, which is only available in the star topology. In a star network that uses the beacon enabled mode, the coordinator periodically sends beacon frame to synchronize the neighboring nodes. As a result, network coverage is limited to the transmission range of the coordinator, thereby limiting the nodes number and the network scale. The MSTN requires a large network scale. Therefore, the beacon enabled mode in the IEEE 802.15.4-2006 is not suitable for the MSTN. To solve this problem, some changes need to be made to send beacon frames in the following modes:

the gateway nodes and routing nodes send beacon frames, but do not forward the beacon frames;

the gateway nodes send beacon frames for time synchronization and joining of the neighboring routing nodes and for broadcasting the superframe information of the gateway nodes; and the routing nodes send beacon frame for time synchronization and joining of the intra-cluster field nodes and for broadcasting superframe information of the gateway nodes.

The MSTN supports frequency hopping, and the hopping sequence is designated by the network manager. As shown in Table 1, frequency hopping in the MSTN network comprises three mechanisms: AFS, AFH, and TH.

TABLE 1

MAC mechanisms of the invention

| IEEE 802.15.4-2006 | MSTN | MAC mechanism | | Hopping mechanism |
| --- | --- | --- | --- | --- |
| Beacon | Beacon | TDMA | FDMA + | AFS |
| CAP | CAP | CSMA | TDMA | |
| CFP | CFP | TDMA | | |
| Inactive | Intra-cluster period | | TDMA | AFH |
| | Inter-cluster period | | TDMA | TH |
| | Sleeping | — | | — |

1) AFS: in the MSTN superframe, the beacon period, contention access period, and contention-free access period use the same channel in a single superframe cycle, and the channels change according to the channel conditions in different superframe cycles. When the channel conditions are bad, the nodes change the communication channel. The channel conditions are evaluated by Packet Loss Rate and retransmission times.

2) AFH: in the MSTN superframe, the timeslot of the intra-cluster communication stage changes the communication channel according to the channel conditions; when the channel conditions are bad, the nodes change the communication channel conditions. The channel conditions are evaluated by Packet Loss Ratio and retransmission times. The structure of the frequency hopping sequence is: <timeslot 1, channel 1><timeslot 2, channel 2>...<timeslot i, channel i>.

3) TH: to avoid interference and fading, the user changes communication channel in each timeslot according to a frequency hopping sequence that is predefined by the user; the timeslot hopping mechanism is employed for the intra-cluster communication during the inactive period; the structure of frequency hopping sequence is: <timeslot 1, channel 1> <timeslot 2, channel 2>...<timeslot i, channel i>.

For AFS and AFH, the channel needs measuring. The channel measurement offers the channel conditions to the network manager and the route nodes, thereby helping the network manager and route nodes allocate communication channels. One field node (or routing node) can measure one or more channel conditions and report the statistical information to the route nodes (or a network manager). The field nodes transmit the measurement result collected therefrom to the route nodes, and the route nodes transmit the channel conditions collected therefrom and the channel conditions from the field nodes to the network manager.

In the process of channel measurement, each node records the conditions of all the channels communicating therewith. The recorded performance information comprises: link quality indication (LQI), packet loss rate, and retransmission times. The packet loss rate is determined by the number of the acknowledgment frames (ACK) and the number of transmitted packets.

For AFS, the beacon frame of the last super frame period forecasts the channel that will be used in the next superframe cycle. For AFH, the last timeslot forecasts the channel that will be used in the next timeslot.

As stated, this invention uses TDMA and FDMA. Therefore, the allocation of communication resources is necessary. This invention is directed toward a hybrid mesh and star structure network, so it uses a two-stage resource allocation method that allocates the communication resources via two stages. The two-stage resource allocation comprises the following steps. The network manager in the gateway node allocates resources for the routing nodes in a mesh network. The resources comprise the resources used by the routing nodes for communication in the mesh network and the resources that the routing nodes allocate to the field nodes; then, the routing nodes allocate communication resources to the field nodes in the star network.

The communication resources comprise timeslots and channels. The following scheduling rules are employed for allocating resources.

First allocating fixed channels;

First allocating timeslots to the nodes with the fastest update rate;

First allocating resources to the packet with the earliest generating time; and

First allocating resources to the highest priority packet.

Figure 7A:
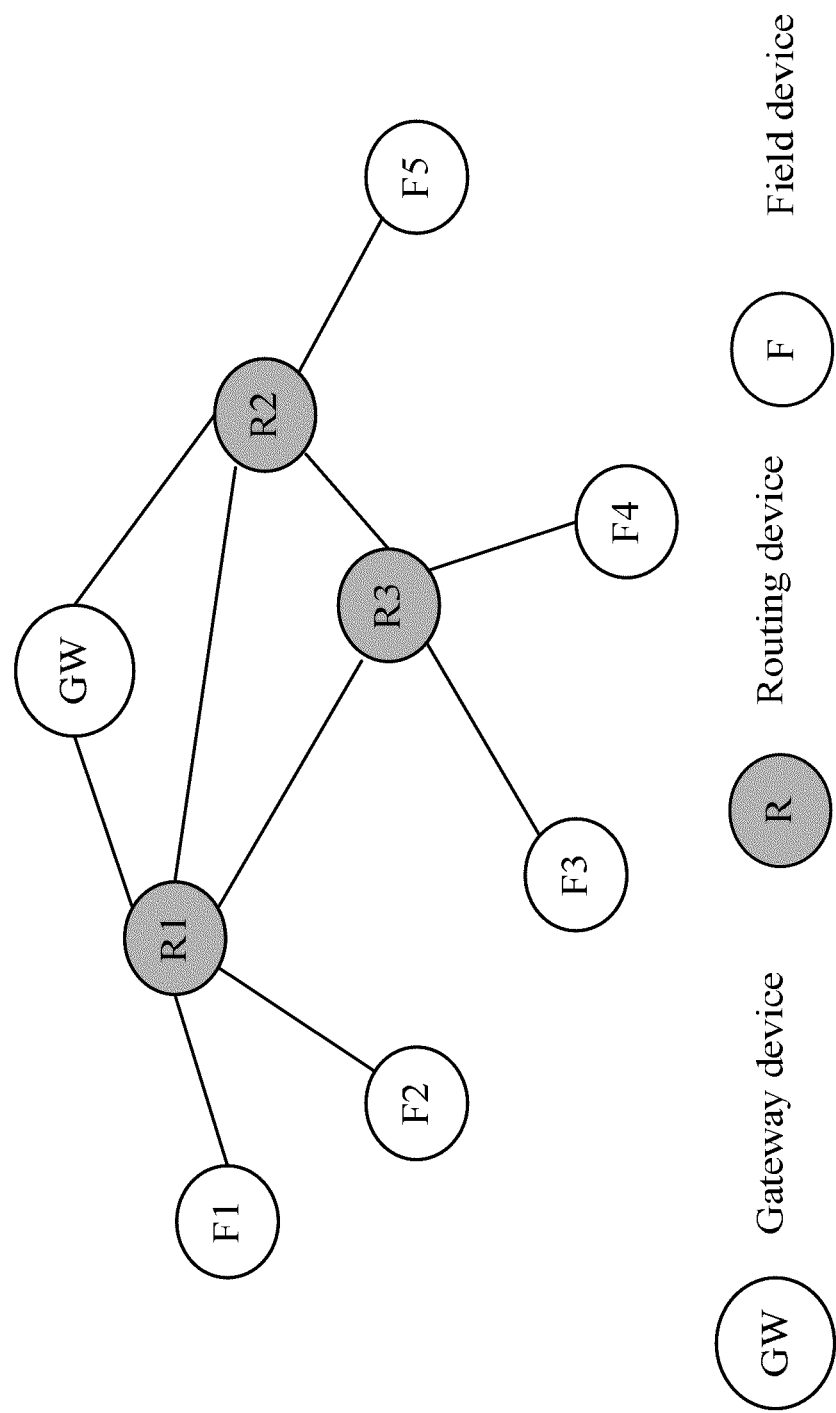
FIG. 7A is a diagram showing a network topology according to one embodiment of the invention.
Figure 7B:
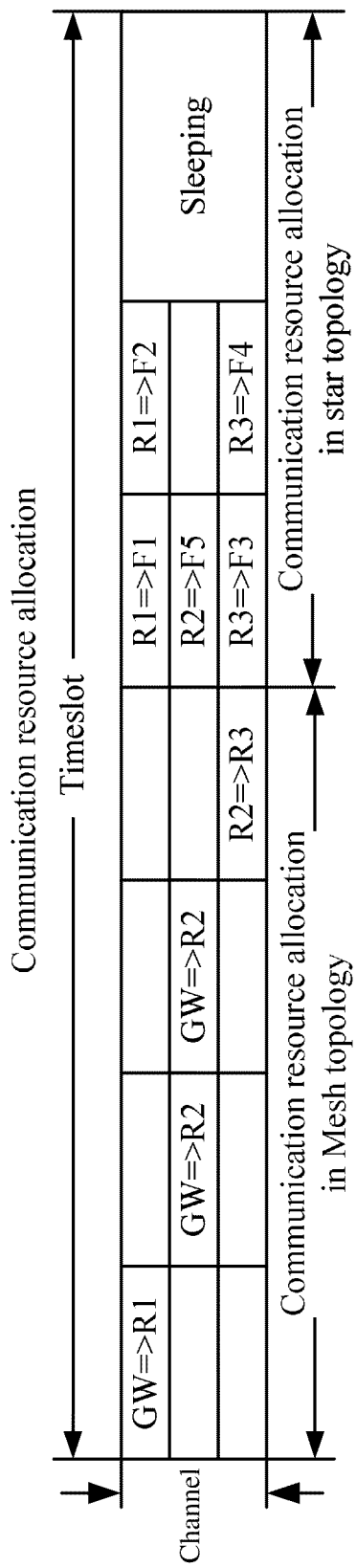
FIG. 7B is a diagram showing a resource allocation result of FIG. 7A.

As shown in FIGS. 7A and 7B, examples of the resource allocation in the hybrid mesh and star topology structure. As shown in FIG. 7A, first, the network manager (NM) residing in the gateway node allocates communication resources to the routing nodes R1, R2, and R3. These communication resources are used for communication among R1, R2, and R3, for communications between the routing nodes and the gateway nodes, and for intra-cluster communication. Second, the routing nodes receive communication resources from the gateway nodes, choose and allocate resources for the intra-cluster field nodes, which are used for intra-cluster communications among the field nodes and the corresponding routing nodes. As shown in FIG. 7B, after the gateway node allocates communication resources for R1, R2 and R3, R1 allocates communication resources for F1 and F2; R2 allocates communication resources for F5; and R3 allocates communication resources for F3 and F4.

To communicate, nodes must store the allocated communication resources comprising the information of superframe attributes and link attributes. The link attributes comprise the information related to communication in each timeslot in the superframe attributes, and declare the communication parameters among adjacent nodes in the network. Each node maintains its own link information.

As shown in Table 2, the superframe attributes comprise SuperframeID, SuperframeMultiple, NumberSlots, ActiveFlag, and ActiveSlot.

TABLE 2

Superframe Attributes

| Name | Data type | Valid range | Description |
| --- | --- | --- | --- |
| SuperframeID | Unsigned16 | 0 to 65535 | Unique identifier of the superframe, supplied by the NM |
| SuperframeMultiple | Unsigned8 | 0 to 255 | SuperframeMultiple = maximum data update rates/minimum data update rates. It is used for restricting the MSTN superframe length and is also used for processing the long period data transmission. |
| NumberSlots | Unsigned16 | 0 to 65535 | Superframe size (counts of timeslots) |
| ActiveFlag | Boolean | 0, 1 | Superframe active flag: 0 = Inactive; 1 = Active. |
| ActiveSlot | Unsigned48 | 0 to ($2^{48}$ − 1) | Absolute timeslot number when a superframe begins active |

As shown in table 3, the link attributes comprises LinkID, NeighborID, LinkType, RelativeSlotNumber, LinkSuperframeNum, ActiveFlag, ChannelIndex, and SuperframeID.

TABLE 3

Link attributes

| Name | Data type | Valid range | Description |
| --- | --- | --- | --- |
| LinkID | Unsigned16 | 0 to 65535 | Unique identifier of the link |
| NeighborID | Unsigned16 | 0 to 65535 | Reference to a neighbour table entry, which is empty when the NM allocates links to a routing device for intra-cluster communication. |
| LinkType | Unsigned8 | 0 to 31 | Bit 0 represents the link type: 0 = Unicast; 1 = Broadcast; Bit 1 and bit 2 represent the character of a link: 00 = Transmitting; 01 = Transmit-shared; 10 = Receiving; Bit 3 represents the type of a timeslot: 0 = Data timeslot; 1 = Management timeslot. Bit 4 represents the aggregation character: 0 = Non-aggregation timeslot; 1 = Aggregation timeslot. |
| RelativeSlotNumber | Unsigned16 | 0 to 65535 | Relative timeslot number |
| LinkSuperframeNum | Unsigned8 | 0 to 255 | LinkSuperframeNum = data update rate of this device/the minimum data update rate. It is used for processing the long period data transmission. |
| ActiveFlag | Boolean | 0, 1 | Indicating that if a link is being used: 0 = Not used; 1 = Being used. |
| ChannelIndex | Unsigned8 | 0 to 31 | The channel sequence numbers for this link, namely, the sequence numbers of the main channels. |
| SuperframeID | Unsigned16 | 0 to 65535 | Reference to an superframe in the superframe table |

The following describes how to establish a network.

Before joining MSTN, a routing node or a field node evaluate the connectivity and chooses one or more father nodes.

The indices of the connectivity evaluation comprises: received signal strength indication (RSSI), energy detection (ED), and link quality indication (LQI).

To evaluate the connectivity, a routing node or a field node detects packets from neighboring nodes (or gateway nodes) before joining the network to identify routing nodes (or gateway nodes) within the communication range. The process is that: a new routing node or field node waits for messages from routing nodes (or gateway nodes) in a certain channel, collects the connection information, and switch to another channel, continues to collect the connection information from other routing nodes (or gateway nodes). According to the connectivity evaluation of multiple routing nodes (or gateway nodes), the new node then chooses the best one, which is not limited to the routing nodes (or gateway nodes) in a specific band.

The joining request and joining response of the field nodes or handheld nodes must be forwarded by the routing nodes already present in the network. If the routing nodes cannot reach the gateway node in one hop, it requires other routing nodes to forward the joining request and joining response. The nodes used to forward the joining request and joining response by one hop are called proxy routing nodes The contents of the joining request comprise the physical address and the node type (routing node, field node, or handheld node). The contents of the joining response comprise the join state, the physical address of the new node, and the short address of the new node. The join state indicates the result (success or failure) of the nodes applying for joining the network. The short address of the new node is a 16-bit address distributed by the gateway node after the node successfully joins.

When a routing node joins a network, the joining process is divided into two kinds (one-hop joining and multi-hop joining) based on the number of hops between the routing nodes and the gateway nodes. If the new routing node sends a joining request to the gateway node by one hop, the one-hop joining process is used. If the new routing node joins the network by using another existing routing node, the multi-hop joining process is used. The joining processes of the field nodes and the handheld nodes are similar to those used for the routing nodes.

The joining primitives in an IEEE 802.15.4-2006 MAC layer are applied using a one-hop joining process for a routing node in the MSTN, which is not described in this invention.

The following describes how a node (routing node, field node, or handheld node) joins the network.

Before joining the network, a node shall have been provided with a join key.

Figure 8:
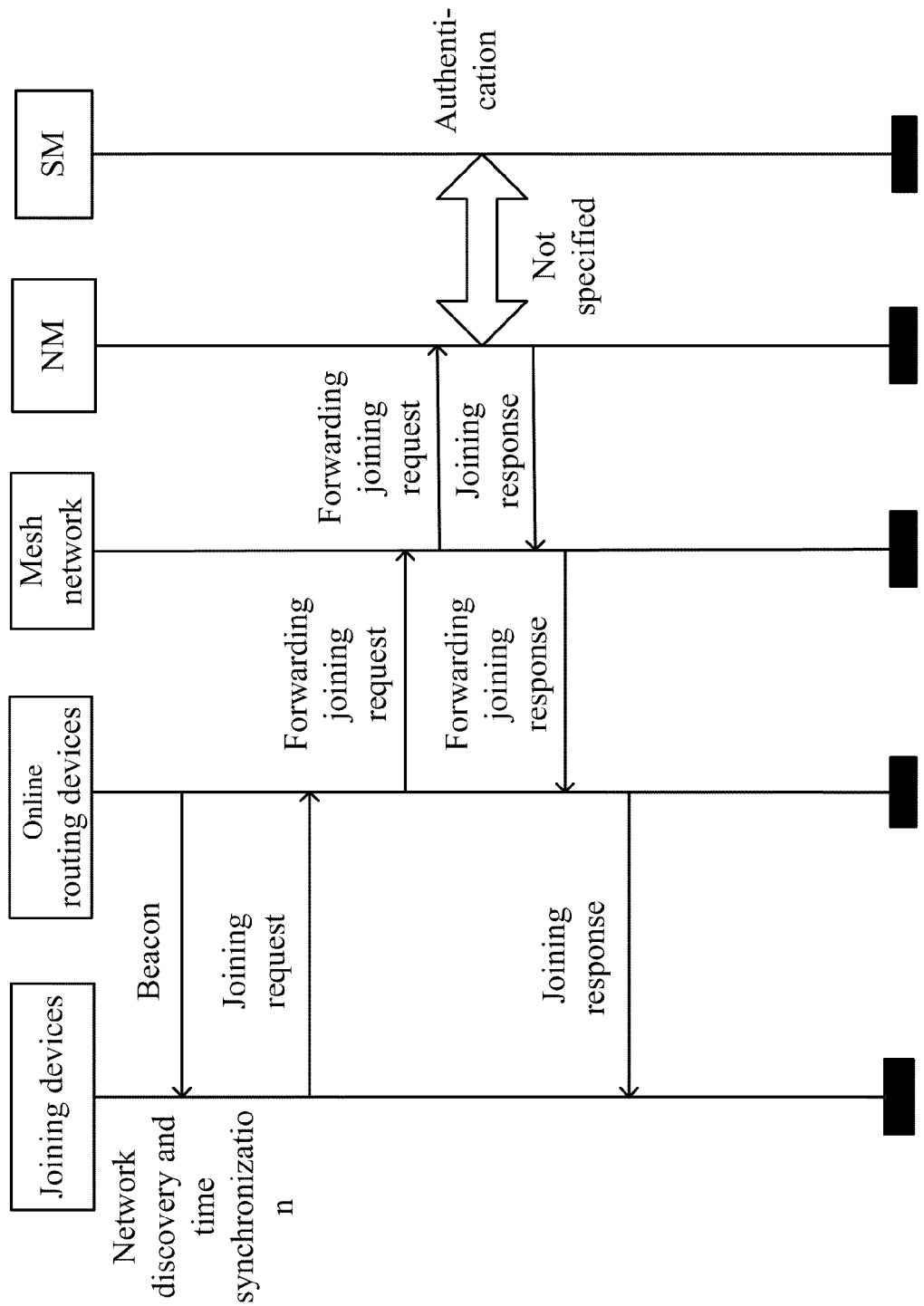
FIG. 8 is a diagram of the process by which a node joins the network according to one embodiment of the invention.

As shown in FIG. 8, the process of a node joins to a network is as follows:
1) Network discovery: the node waiting for joining the network continues scanning available channels in the network until it successfully receives beacons from joined routing nodes or gateway node;
2) Time synchronization: the node waiting for joining the network chooses the beacon emitting nodes as the proxy routing nodes, and uses the time information in the beacon to complete the time synchronization;
3) Sending a joining request: the node waiting for joining the network sends request to the proxy routing nodes, and the proxy routing nodes forward the request to the gateway nodes;
4) Returning a joining response: after the gateway node receives the joining response and finishes the security authentication, the joining response is returned;
5) Processing the response: the node waiting for joining the network receives the joining response forwarded by the proxy routing nodes; if the response is negative, the node waiting for joining the network shall restart this joining process; otherwise, the joining process shall be finished; and
6) Broadcast beacon: if the node waiting for joining the network has successfully joined the network and is acting as a routing node, it shall broadcast beacons.

After the node joins the network, the gateway node should allocate communication resources for it. Since a two-stage resource allocation method is applied in the example, the processes of resource allocation for routing node, field node, and handheld node are different, which is described below separately.

If a new routing node joins the network by one hop, the gateway node directly allocates the communication resources comprising a superframe, link, and route by using commands thereof. If a new routing node joins the network by multiple hops, these command frames must be forwarded using online routing nodes.

Figure 9:
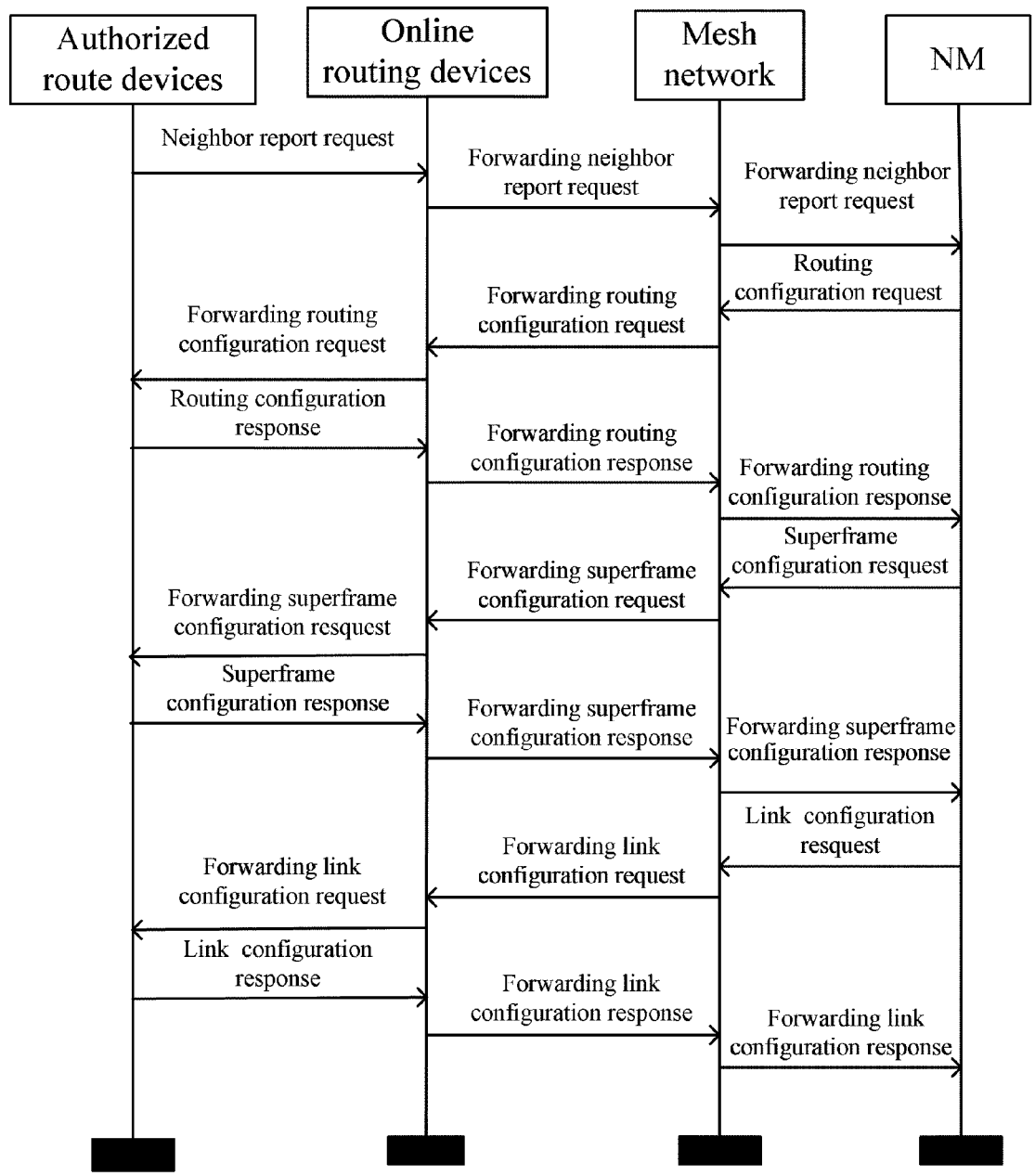
FIG. 9 is a diagram of the communication resource and route allocation processes for a routing node according to one embodiment of the invention.

FIG. 9 shows a process of communication resource allocation for a routing node.

After joining a network, the routing node reports the neighbors' information to the gateway node; the gateway node configures a routing table for the new routing node based on the reported neighbors' information; the gateway node configures a superframe table for the new routing node based on the reported neighbors' information; and the gateway node configures a link table for the new routing node based on the reported neighbors' information.

For a field node that has joined the network, the communication resources thereof are pre-allocated by the gateway node to the routing node (the cluster head) in the cluster, and then allocated to the newly joined field node by the cluster head. The communication resources of the field node are used for intra-cluster communication in a superframe.

Figure 10:
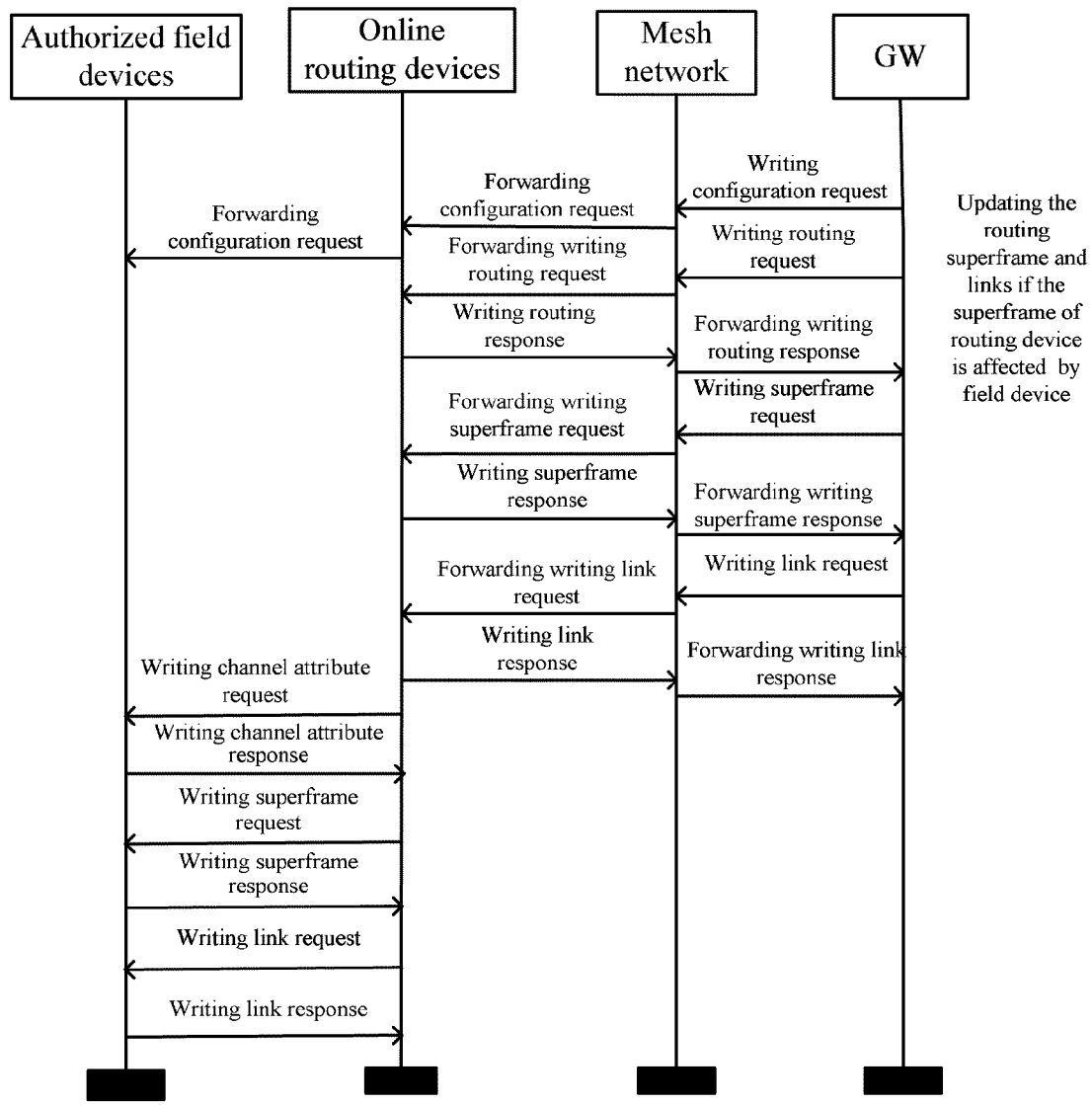
FIG. 10 is a diagram of the communication resource allocation process for a field node according to one embodiment of the invention.

FIG. 10 shows a process by which communication resources are allocated to a field node, that is,
A user configures the field node;
If the joining of the fixed field node affects the superframe of a routing node, the route, superframe, and link of the routing node should be updated; and
The routing node saves the information of the route, superframe, and link locally, and allocates resources for the field node based on the resource conditions, and then, the routing node writes the information of the superframe and link to the field node.

The process of allocating communication resources to handheld nodes is similar, except that the communication resources for handheld nodes are allocated during the CFP period of a superframe.

The invention claimed is:
1. A method for wireless sensor network (WSN) communication in a mesh and star topology network (MSTN), comprising the steps of:
   a) connecting a plurality of nodes in a WSN to form a mesh and star hybrid topology structure;
   b) based on the topology structure, defining a superframe structure based on IEEE 802.15.4-2006;
   c) based on the topology structure and superframe structure, defining methods for long period data processing, connectivity assessment, medium access control, chan- nel measurement, frequency hopping, beacon frame formation, and two-stage resource allocation;

d) based on the topology structure, superframe structure, and methods, defining a method for network establishment; and e) based on the network establishment method, defining a method for MSTN communications, wherein the superframe structure is based on a medium access control (MAC) layer of IEEE 802.15.4-2006 and comprises a beacon frame period, a contention access period (CAP), a contention-free access period (CFP), an intra-cluster communication period, an inter-cluster communication period, and a sleeping period;

wherein the beacon frame period is used for timeslot synchronization and superframe information publishing; the CAP is used for node addition and intra-cluster management, and realizes medium access control using the timeslot carrier sense multiple access with collision avoidance (CSMA/CA) algorithm; the CFP is used for emergency communications, communications among handheld nodes and cluster heads, which are distributed by the routing nodes; the CFP employs a time division multiple access (TDMA) to achieve communication; the intra-cluster communication period, which is used for intra-cluster communication, expands the CFP; the inter-cluster communication period is used for the inter-cluster communication and management; and both intra-cluster communication and inter-cluster communication adopt the TDMA approach and timeslot frequency hopping communication, and communication resources are written to the nodes in the form of <channel, timeslot>.

2. The method of claim 1, wherein the MSTN comprises four types of physical nodes: gateway nodes, routing nodes, field nodes, and handheld nodes; the gateway nodes are a data gathering center and provide interfaces for the MSTN and other wireless sensor networks to connect with a wired network; the routing nodes support all types of sensors and duplicate and retransmit data in the MSTN; the field nodes are set up in industrial fields and connected with sensors and actuators for transmitting process measurement and control data to accomplish applications; the handheld nodes access network temporarily and configure and maintain the MSTN nodes.

3. The method of claim 2, wherein the gateway nodes comprise two function modules: a network manager and a security manager; the network manager and security manager achieve their functions separately; the network manager is used for managing node additions, forming a network, and monitoring the performance of the whole network; and the security manager is used for key management and security authentication of the routing nodes and field nodes.

4. The method of claim 2, wherein the mesh and star hybrid topology structure comprises a first level and a second level; the first level is a mesh network comprising the routing nodes and the gateway nodes; the routing nodes communicate with at least one field node, one gateway node, and one another routing node; the second level is a star network comprising the routing nodes and the field nodes; and the field nodes communicate with only one routing node, but not with each other.

5. The method of claim 2, wherein the superframe is maintained by each node and a length thereof in each period is defined by the node; the superframe length is 2N times a basic length of the superframe wherein N is a positive integer; the basic length of the superframe is 32 timeslots; the superframe length of the field nodes is decided by a data update rate thereof; the superframe length of the routing nodes is a minimum superframe length of all the field nodes in the star network; the superframe length in the gateway nodes is decided by a minimum superframe length of neighboring routing nodes thereof.

6. The method of claim 2, wherein the intra-cluster communication is communication between the routing nodes and the field nodes; and the inter-cluster communication is communication among the routing nodes or between the routing nodes and the gateway nodes.

7. The method of claim 2, wherein the beacon frame period, CAF, and CFP use the same channel in a single superframe cycle; when a channel is lacking, communications among the different clusters employ a time division strategy.

8. The method of claim 2, wherein a payload of the beacon frame publishes the extensional superframe information at least comprising the following information: a cluster ID, an absolute timeslot number, and a next channel used in the next superframe cycle.

9. The method of claim 2, wherein the beacon frames are sent in the following modes:

a) the gateway nodes and routing nodes send the beacon frames, but do not forward the beacon frames;

b) the gateway nodes send beacon frames for time synchronization and joining of neighboring routing nodes and for broadcasting the superframe information of the gateway nodes; and c) the routing nodes send the beacon frame for time synchronization and joining of the intra-cluster field nodes and for broadcasting the superframe information of the gateway nodes.

10. The method of claim 2, wherein the frequency hopping is realized according to one of three mechanisms:

a) Adaptive Frequency Switch (AFS): in the MSTN superframe, the beacon period, CAP, and CFP use the same channel in a single superframe cycle, and the channels change according to the channel conditions in different superframe cycles; when the channel conditions are bad, the nodes change the communication channel; and the channel conditions are evaluated by Packet Loss Rate and retransmission times;

b) Adaptive Frequency Hopping (AFH): in the MSTN superframe, the timeslot of intra-cluster communication stage changes the communication channel according to the channel conditions; when the channel conditions are bad, the nodes change the communication channel conditions; the channel conditions are evaluated by Packet Loss Ratio and retransmission times; the intra-cluster communication period of an inactive period adopt the hopping mechanism; and the structure of the frequency hopping sequence is: <timeslot 1, channel 1> <timeslot 2, channel 2> . . . <timeslot i, channel i>; and c) Timeslot Hopping (TH): to avoid interference and fading, the user changes communication channel in each timeslot according to a frequency hopping sequence that is predefined by the user; the timeslot hopping mechanism is employed for intra-cluster communication during an inactive period; and the structure of frequency hopping sequence is: <timeslot 1, channel 1> <timeslot 2, channel 2> . . . <timeslot i, channel i>.

11. The method of claim 2, wherein the channel measurement is carried out as follows: one field node or routing node measures one or more channel conditions and reports the statistical information to the route nodes or a network manager; the field nodes transmit the measurement result collected therefrom to the route nodes, and the route nodes transmit the channel conditions collected therefrom and the channel conditions from the field nodes to the network manager.

12. The method of claim 2, wherein each node records the conditions of all the channels communicating therewith during the measurement period; the recorded performance information comprises: link quality indication (LQI), packet loss rate, and retransmission times; the packet loss rate are determined by the number of the acknowledgment frames (ACK) and the number of transmitted packets.

13. The method of claim 2, wherein the method of two-stage resource allocation is as follows:
   a) a network manager in the gateway nodes allocates resources for the routing nodes in a mesh network; the resources comprise resources used by the routing nodes for communications in the mesh network and resources that the routing nodes allocate to the field nodes; and
   b) the routing nodes allocate communication resources to the field nodes of the star network.

14. The method of claim 13, wherein following schedules are employed for allocating resources in the star network:
   a) first allocating fixed channels;
   b) first allocating timeslots to the nodes with the fastest update rate;
   c) first allocating resources to the packet with the earliest generating time; and
   d) first allocating resources to the highest priority packet.

15. The method of claim 13, wherein the routing nodes and field nodes save, respectively, the resources allocated by the network manager for the routing nodes and the resources allocated by the routing nodes for the field nodes; these resources involve superframe and link attributes; the link attributes comprise the information related to communication in each timeslot in the superframe attributes, and declare the communication parameters among adjacent nodes in the network; each node maintains its own link information; the superframe attribute comprises SuperframeID, SuperframeMultiple, NumberSlots, ActiveFlag, and ActiveSlot; and the link attributes comprises LinkID, NeighborID, LinkType, RelativeSlotNumber, LinkSuperframeNum, ActiveFlag, ChannelIndex, and SuperframeID.

16. The method of claim 2, wherein the network establishment method is as follows: a joining request and joining response of the field nodes or handheld nodes must be forwarded by the routing nodes already present in the network; when the routing nodes cannot reach the gateway node in one hop, other routing nodes are needed to forward the joining request and joining response.

17. The method of claim 16, wherein the process by which a node joins a network comprises:
   a) Network discovery: the node waiting for joining the network continues to scan available channels in the network until it successfully receives a beacon from joined routing nodes or gateway nodes;
   b) Time synchronization: the node waiting for joining the network chooses the beacon-emitting node as the proxy routing node, and uses the time information in the beacon to complete the time synchronization;
   c) Sending a joining request: the node waiting for joining the network sends a request to the proxy routing node, and the proxy routing node forwards this request to the gateway node;
   d) Returning a joining response: after the gateway node receives the joining response and finishes the security authentication, the joining response is returned;
   e) Processing the response: the node waiting for joining the network receives a joining response forwarded by the proxy routing node; when the response is negative, the node waiting for joining the network shall restart this joining process; otherwise, the joining process shall be finished; and
   f) Broadcast beacon: when the node waiting for joining the network has successfully joined the network and is acting as a routing node, it shall broadcast beacons.

18. The method of claim 17, wherein the gateway node allocates communication resources and routes to the node joining the network; the processes of resource allocation to routing nodes, field nodes, and handheld nodes are different; in the process of allocating communication resources to the routing nodes, when a new routing node joins the network by one hop, the gateway node directly builds a superframe for the node and allocates superframes, links and routes to the routing node using the command frames that operates on the superframes, links, and routes; when the new routing node joins the network by multi-hops, the command frames that operates on the superframes, links, and routes is forwarded by the existing routing nodes; in the process of allocating communication resources to a newly joined field node, the communication resources are pre-allocated by the gateway node to the routing nodes in one cluster, and then allocated to the newly joined field node by the cluster head; the communication resources of the field node are used for intra-cluster communication in a superframe; the process by which communication resources for the field nodes are allocated is as follows:
   a) a user configures the field node;
   b) when joining of a fixed field node affects the superframe of the routing node, the routes, superframes, and links thereof should be updated; and
   c) the routing node saves the routing information, superframes, and links locally, allocates resources for the field node based on the resource situation, then, the routing node writes the superframe information and links into the field node.

19. The method of claim 1, wherein the long period data is defined as the data whose data update rate is either greater than a maximum superframe length of IEEE 802.15.4-2006 or greater than the data update period of the routing nodes in a cluster; the long period data transmitted in the current superframe cycle are judged by the following method:
   a) when 0<TransmitFlag<SuperframeMultiple and TransmitFlag=LinkSuperframeNum, the field nodes transmit data in this superframe cycle;
   b) when TransmitFlag=0 and LinkSuperframeNum=SuperframeMultiple, the field nodes transmit data in this superframe cycle; and
   c) otherwise, the long period data are not transmitted in the current superframe cycle.

* * * * *